United States Patent
Huss

(10) Patent No.: US 9,108,844 B2
(45) Date of Patent: Aug. 18, 2015

(54) METHOD FOR PRODUCING HYDROGEN CHLORIDE OR AN AQUEOUS SOLUTION THEREOF USING UNTREATED SALT WATER, THUS PRODUCED PRODUCT, USE OF THE PRODUCT AND ELECTRODIALYSIS SYSTEM

(75) Inventor: Rainer Huss, Buchenberg (DE)

(73) Assignee: WME GESELLSCHAFT FÜR WINDKRAFTBETRIEBENE MEERWASSERENTSALZUNG MBH, Starrvitz (DE)

(*) Notice: Subject to any disclaimer, the term of this patent is extended or adjusted under 35 U.S.C. 154(b) by 412 days.

(21) Appl. No.: 13/805,434

(22) PCT Filed: Aug. 27, 2010

(86) PCT No.: PCT/EP2010/005284
§ 371 (c)(1),
(2), (4) Date: Jun. 4, 2013

(87) PCT Pub. No.: WO2011/160662
PCT Pub. Date: Dec. 29, 2011

(65) Prior Publication Data
US 2013/0272952 A1    Oct. 17, 2013

(30) Foreign Application Priority Data
Jun. 21, 2010    (DE) .................. 10 2010 017 491

(51) Int. Cl.
*B01D 61/46* (2006.01)
*C01B 7/03* (2006.01)
*C02F 1/469* (2006.01)
*C01B 7/01* (2006.01)
(Continued)

(52) U.S. Cl.
CPC ............ *C01B 7/035* (2013.01); *B01D 61/46* (2013.01); *C01B 7/01* (2013.01); *C02F 1/4693* (2013.01);
(Continued)

(58) Field of Classification Search
None
See application file for complete search history.

(56) References Cited

U.S. PATENT DOCUMENTS 4,740,281 A * 4/1988 Chlanda et al. ............... 204/528
5,162,076 A * 11/1992 Chiao et al. .................. 204/534
(Continued)

FOREIGN PATENT DOCUMENTS

DE    102 17 885 A1    11/2003
EP    0 999 179 A2    5/2000
(Continued)

OTHER PUBLICATIONS

International Preliminary Report of Patentability, dated Jan. 10, 2013, corresponding to PCT Application PCT/EP2010/005284, international filed Aug. 27, 2010 (6 pages).
(Continued)

*Primary Examiner* — Arun S Phasge
(74) *Attorney, Agent, or Firm* — Chiesa Shahinian & Giantomasi PC

(57) ABSTRACT

A method of producing hydrogen chloride, or an aqueous solution thereof, includes the steps: a) furnishing a first electrolyte containing chloride ions; b) carrying out an electrodialysis, wherein the first electrolyte is subjected to a cathodic reduction resulting in a catholyte, wherein the concentration of chloride ions drops in the first electrolyte, the concentration of hydroxide ions increases in the first electrolyte, and a product in the form of hydrogen chloride or an aqueous solution thereof is produced; c) processing of at least a partial quantity of the catholyte, resulting in the first electrolyte, wherein an untreated saline water is used, the concentration of chloride ions increases in the catholyte and the concentration of hydroxide ions drops in the catholyte; and d) at least partial reuse of the catholyte processed according to step c) as the first electrolyte in step b).

19 Claims, 1 Drawing Sheet

(51) Int. Cl.
*C25B 7/00* (2006.01)
*C02F 103/06* (2006.01)
*C02F 103/08* (2006.01)

(52) U.S. Cl.
CPC ............. *C25B 7/00* (2013.01); *B01D 2311/263* (2013.01); *B01D 2313/12* (2013.01); *B01D 2313/16* (2013.01); *B01D 2313/32* (2013.01); *C02F 2103/06* (2013.01); *C02F 2103/08* (2013.01); *C02F 2201/46115* (2013.01); *C02F 2201/46185* (2013.01)

(56) References Cited

U.S. PATENT DOCUMENTS

| 5,264,097 A | 11/1993 | Vaughan |
| 2002/0157952 A1 | 10/2002 | Kimura et al. |

FOREIGN PATENT DOCUMENTS

| EP | 1 232 997 A1 | 8/2002 |
| JP | 52136885 A | 11/1977 |
| JP | 55003823 | 1/1980 |
| JP | 2000143211 A | 5/2000 |
| JP | 2002239554 A | 8/2002 |
| WO | 9507752 A1 | 3/1995 |
| WO | 2010023740 A1 | 3/2010 |
| WO | 2011160663 A1 | 12/2011 |

OTHER PUBLICATIONS

Unpublished U.S. Appl. No. 13/805,435 [371(c) date: May 9, 2013].
Notification of Reasons for Rejection mailed on Oct. 14, 2014, in connection with JP Patent Application No. 2013-515707, 8 pgs.

* cited by examiner

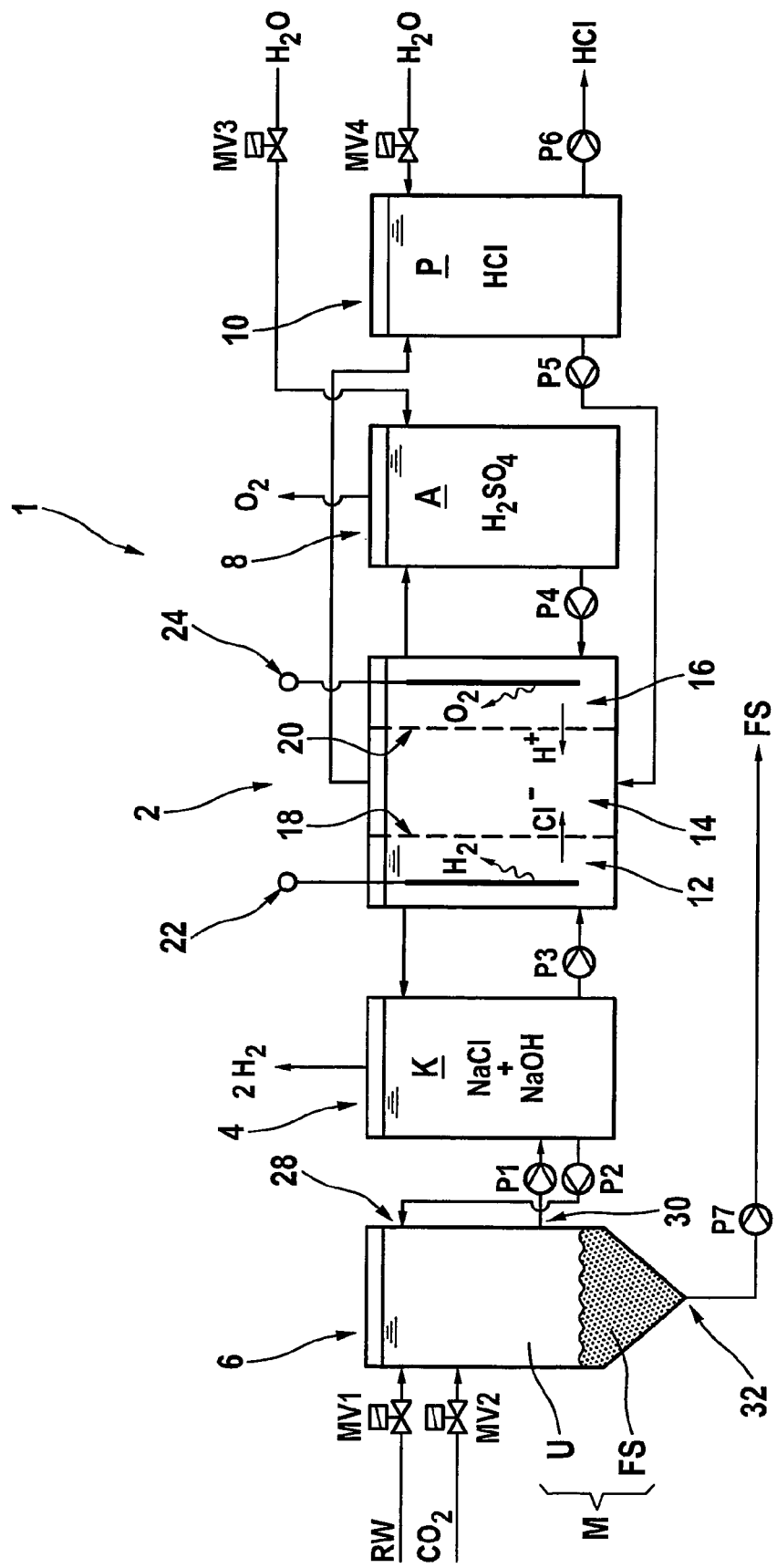

METHOD FOR PRODUCING HYDROGEN CHLORIDE OR AN AQUEOUS SOLUTION THEREOF USING UNTREATED SALT WATER, THUS PRODUCED PRODUCT, USE OF THE PRODUCT AND ELECTRODIALYSIS SYSTEM

CROSS-REFERENCE TO RELATED APPLICATIONS

This is a U.S. national stage application under 35 U.S.C. §371 of International Patent Application No. PCT/EP2010/005284, filed Aug. 27, 2010, and published as WO 2011/160662 on Dec. 29, 2011, which claims the benefit of German Patent Application No. 10 2010 017 491.2, filed Jun. 21, 2010, both of which are incorporated by reference herein. This application is related to U.S. patent application Ser. No. 13/805,435, which is a U.S. national stage application under 35 U.S.C. §371 of International Patent Application No. PCT/EP2010/005285, filed Aug. 27, 2010, and published as WO 2011/160663, on Dec. 29, 2011, which claims the benefit of German Patent Application No. 10 2010 017 490.4, filed Jun. 21, 2010.

BACKGROUND OF THE INVENTION

Hydrochloric acid is employed in many technological fields, where its delivery to the place of use may sometimes cause considerable problems.

This is particularly true if the place of use is located in regions of use that are difficult to reach. Thus, for example, hydrochloric acid may be employed on a large scale in sea water desalination plants as an anti-scaling and cleaning agent.

Hydrochloric acid is moreover employed in oil drilling in order to open up pores in a rock formation and produce carbon dioxide in the carbonate rock in order to enhance the conveying efficiency.

In addition, hydrochloric acid is also employed in remote regions as a cleaning and disinfecting agent or a mordant.

Particularly for the case that the place of use is located in a region that may only be reached with difficulty, such as remote parts of the country or islands, concentrated hydrochloric acid is employed for the purposes named in the foregoing. The use of concentrated acid on the one hand has the advantage that the bulk having to be transported may be kept small.

On the other hand, however, there is a permanent risk of the respective transport containers developing a leak. Moreover, during the transport of concentrated, fuming hydrochloric acid, volatile HCl gas is generally also emitted to the environment. This may result in corrosion occurring in the vicinity of the transport vessels.

As an alternative, the use of technical sulfuric acid is also frequently preferred. The latter is concentrated in a substantially higher degree and presents a normality concentration in val/L that is about three times as high.

Thus, despite the oftentimes better suitability of hydrochloric acid for a predetermined process, it is preferred to employ the non-fuming sulfuric acid which has no impact on the vicinity and is less corrosive. On the other hand, sulfuric acid forms poorly soluble salts with the alkaline earth metal ions $Ca^{2+}$, $Sr^{2+}$, and $Ba^{2+}$. This may possibly result in undesirable precipitations.

For technological reasons as well as in consideration of the safety aspects set forth in the foregoing, the use of diluted hydrochloric acid would therefore also be desirable in regions of use that are difficult to reach such as, e.g., sea water-desalination plants or oil drilling platforms.

BRIEF SUMMARY OF THE INVENTION

It is therefore the object of the present invention to produce hydrogen chloride or an aqueous solution thereof immediately at the place of use thereof by using an untreated saline water.

This object is achieved through a method described herein of producing hydrogen chloride or an aqueous solution thereof, a product described herein produced by the method described herein, a use described herein of the product described herein, and an electrodialysis system described herein for carrying out the method described herein.

The method of producing hydrogen chloride (HCl) or an aqueous solution thereof by using an untreated saline water (RW) includes the steps of:
a) furnishing a first electrolyte (E1),
   wherein the first electrolyte (E1) contains chloride ions ($Cl^-$);
b) carrying out an electrodialysis,
   wherein the first electrolyte (E1) is subjected to a cathodic reduction from which results a catholyte (K),
   wherein the concentration of chloride ions ($Cl^-$) drops in the first electrolyte (E1),
   wherein the concentration of hydroxide ions ($OH^-$) increases in the first electrolyte (E1), and
   wherein a product (P) in the form of hydrogen chloride (HCl) or an aqueous solution thereof is produced;
c) processing of at least a partial quantity of the catholyte (K), from which results the first electrolyte (E1),
   wherein an untreated saline water (RW) is used,
   wherein the concentration of chloride ions ($Cl^-$) increases in the catholyte (K), and
   wherein the concentration of hydroxide ions ($OH^-$) drops in the catholyte (K); and
d) at least partial reuse of the catholyte (K) processed according to step (c) as the first electrolyte (E1) in step (b).

The product, preferably hydrogen chloride (HCL) or an aqueous solution thereof, is produced with at least the above method.

The use of the product, preferably hydrogen chloride (HCL) or an aqueous solution thereof, produced with at least the above method, is described herein for conditioning a saline water, in particular the untreated saline water (RW), for a desalination process.

The electrodialysis system, preferably for carrying out at least the above method, preferably for producing the above product (P), comprises at least:
the electrodialysis cell;
   wherein the electrodialysis cell comprises:
      an anion exchanger membrane,
      a cation exchanger membrane,
      a cathode, and
      an anode;
   the storage vessel for the catholyte (K) and/or the first electrolyte (E1);
   a reaction vessel, preferably for carrying out of step (c).

In accordance with the invention, a method is proposed for producing hydrogen chloride or an aqueous solution thereof, namely, hydrochloric acid, by using an untreated saline water, the method including the steps of:

a) furnishing a first electrolyte,
   wherein the first electrolyte contains chloride ions;
b) carrying out an electrodialysis,
   wherein the first electrolyte is subjected to a cathodic reduction from which results a catholyte,
   wherein the concentration of chloride ions drops in the first electrolyte,
   wherein the concentration of hydroxide ions increases in the first electrolyte, and
   wherein a product in the form of hydrogen chloride or an aqueous solution thereof is produced;
c) processing of at least a partial quantity of the catholyte, from which results the first electrolyte,
   wherein an untreated saline water is used,
   wherein the concentration of chloride ions increases in the catholyte, and
   wherein the concentration of hydroxide ions drops in the catholyte; and
d) at least partial reuse of the catholyte processed according to step (c) as the first electrolyte in step (b).

Here it is provided for the first time to carry out an electrodialysis method wherein a product in the form of hydrogen chloride or an aqueous solution thereof, namely, hydrochloric acid, is produced. At least a partial quantity of the catholyte engendered in the electrodialysis is here processed by using an untreated saline water. The catholyte processed in this manner is then at least partially reused as the first electrolyte in step (b).

Hereby a costly disposal of the catholyte engendered in the electrodialysis is advantageously avoided.

Owing to the reuse of the processed catholyte the method in accordance with the invention moreover allows to at least partly do away with the use of additional chemicals, in particular concentrated acids such as, e.g., concentrated hydrochloric acid.

In this way not only the costs for the starting material for the electrodialysis are reduced but it is also possible to do away with the use of additional chemicals. Namely, in accordance with the invention it is thus possible to produce hydrogen chloride or hydrochloric acid directly at the place of use from frequently already existing, non-hazardous natural salt waters.

Thanks to the method according to the invention it is thus made possible to furnish hydrogen chloride or an aqueous solution thereof in places of use that are difficult to reach or in places of use that may be supplied with chemicals only at considerable logistical expense.

In accordance with the invention, an electrolyte is understood to be an ion-conducting fluid, in particular an aqueous saline solution. A catholyte is understood to be an electrolyte that was acted on electrochemically by means of the cathodic reduction. An anolyte is understood to be an electrolyte that was acted on electrochemically by means of the anodic oxidation.

Advantageous developments of the production method in accordance with the invention are subject matter of additional appended claims.

Thus, the untreated saline water may be a natural or synthetically produced salt water, preferably a sea water, a brackish water, a subsurface water, a spring water, a natural or synthetically produced saline water, or mixtures or concentrates thereof.

It is thus possible to use virtually any naturally existing or synthetically produced saline waters as an untreated water for the method according to the invention. Thus, the method according to the invention employs a substantially ubiquitous starting material, resulting in a wide geographical area of use. Such saline bodies of water are available virtually anywhere and at a low cost.

The untreated saline water may moreover present a salt content, in particular a content of alkali metal chlorides, up to saturation, preferably in the range from 0.4 to 25 (wt.), in a more preferred manner 2 to 10 (wt.), in particular 2.8 to 4.6 (wt.).

Hereby it is advantageously made possible to utilize waters having a high salt content such as, e.g., industrial waste waters having a high salt content, sea water concentrates, or for example natural sea waters having high salt concentrations such as, e.g., water from the Dead Sea, in the framework of the method of the invention. On the other hand, ordinary sea water may also readily be employed as an untreated water in the method of the invention.

Furthermore, in step (a) the first electrolyte may be produced from the untreated saline water.

Processing of the catholyte and/or the first electrolyte according to step (c) may be carried out in batches or continuously.

By processing in batches it is possible to achieve a higher degree of processing of the first electrolyte and thus a higher system efficiency.

If the catholyte is processed continuously, on the other hand, smaller vessel sizes and/or a smaller number of vessels are then advantageously required for carrying out the method.

Furthermore the electrodialysis may be carried out in an electrodialysis cell, wherein the electrodialysis cell comprises three chambers, namely, a cathode space accommodating a cathode, a product space implemented in the form of an intermediate chamber, and an anode space accommodating an anode.

The use of a three-chamber electrodialysis cell is thus for the first time proposed for carrying out an electrodialysis in order to obtain hydrogen chloride or hydrochloric acid, and in particular for carrying out the method of the invention. It does, however, present the drawback that in contrast with the traditionally used four-chamber electrodialysis cell, a separation of the engendered chloride and hydroxide ions by means of an additional membrane does not take place any more. It is thus not possible to obtain chloride-free NaOH.

On the other hand the use of a three-chamber electrodialysis cell presents the advantage that it is possible to do away with the use of an additional membrane. As a result the configuration of the electrodialysis cell is simplified in terms of construction and is more cost-efficient.

The electrodialysis method in accordance with the invention may moreover be carried out at a lower cell voltage, to thereby advantageously lower the energy demand.

In addition, the first electrolyte and/or the catholyte may be circulated at least during step (b) through the cathode space of the electrodialysis cell and via a storage vessel for the catholyte and/or first electrolyte.

By means of this circulation the first electrolyte and/or the catholyte may be homogenized to equalize different concentrations.

Furthermore the conditioning of the first electrolyte and/or of the catholyte is simplified by circulating. Conditioning is presently understood to be the adjustment of a predetermined pH, a predetermined temperature, and/or a predetermined concentration of, e.g., chloride and/or hydroxide ions. The concentration setting may be adjusted by selectively removing spent catholyte and selectively supplying fresh or preferably processed electrolyte.

In addition, the first electrolyte and/or the catholyte may be tempered, in particular cooled, during one of steps (a) to (d).

Thus it is possible to obtain a better conductivity of the electrolyte by adjusting a higher temperature. Nevertheless, by adjusting the electrolyte temperature to no more than 45° C., for example by cooling the electrolyte and/or the catholyte, the membranes disposed in the electrodialysis cell may be protected against thermal impairment.

During at least one of steps (a) to (d), the first electrolyte and/or the catholyte may emit a gas, in particular hydrogen gas.

Owing to the release of a gaseous reaction product such as hydrogen gas from the catholyte, the electrodialysis reaction is improved as a result of the higher electrical conductivity of the catholyte and/or facilitated as a result of the decrease in concentration or partial pressure of the products.

In addition, step (c) may be carried out as soon as the concentration of chloride ions in the first electrolyte and/or in the catholyte has a concentration situated in a range from 30 to 70%, preferably 33 to 50%, in particular 37 to 43% of the concentration of chloride ions in the first electrolyte in step (a).

On the one hand, it is hereby possible to begin the processing of the catholyte according to step (c) of the method of the invention already during the performance of the electrodialysis. Due to this at least partially parallel operation of electrodialysis and processing of the resulting catholyte, the time period required for the overall process may be shortened.

In accordance with the invention it may on the other hand even be provided that the processing according to step (c) of the method of the invention is already begun at the beginning of the electrodialysis reaction.

Due to the at least partially concurrent performance of electrodialysis and processing, an operation of the electrodialysis cell at a low chloride ion concentration is advantageously avoided, for the efficiency of the electrodialysis reaction also drops jointly with the chloride ion concentration.

During step (b), the cell voltage may be situated in a range from 4 to 9, preferably from 5 to 7 Volts (V). Moreover the cell current density may be situated in a range from 500 to 3,000, preferably from 1,000 to 2,000 Amperes per square meter ($A/m^2$).

It was found that due to the use of such a cell voltage and such a cell current density, the electrodialysis reaction of the method of the invention unfolds in an optimum manner.

Furthermore the method may include the step of:

(e) during step (b), using a second electrolyte and/or an anolyte on the anode side, wherein the second electrolyte and/or the anolyte may contain a non-oxidizable acid, preferably sulfuric acid, nitric acid, or phosphoric acid, and/or their alkali metal salts, preferably sodium sulfate, sodium nitrate, or sodium phosphate, or mixtures thereof.

The further, second electrolyte and/or the anolyte serve to advantageously increase the conductivity and thus enhance the electrodialysis reaction. If an acid is employed as the second electrolyte and/or anolyte, it then serves as a low-cost proton source. If a salt such as, e.g., sodium sulfate is employed as the second electrolyte and/or anolyte, then this salt is transformed into its corresponding acid after a short electrodialysis duration.

In addition the method may include the step of:

f) during or after step (b), carrying off the product in the form of an aqueous hydrochloric acid, preferably from the product space of the electrodialysis cell.

In addition, the method may include the step of:

g) conditioning a saline water, in particular the untreated saline water, by means of the product for a desalination process.

Conditioning of a saline water by using the product for a desalination process advantageously prevents the formation of poorly soluble crusts which fixedly adhere to the underground, so-called "scaling", for example in sea water desalination plants. Avoiding these deposits on surfaces, e.g., of heating devices for saline waters, a high heat transfer from a wall to the liquid phase is maintained, whereby the overall efficiency of the plant may be kept at a high level.

In terms of production technology, the object of the invention is achieved through the product (P), preferably hydrogen chloride (HCL) or an aqueous solution thereof, that was produced with the method in accordance with the invention.

In terms of production technology, the object is achieved through a product, preferably hydrogen chloride or an aqueous solution thereof, which is produced by the method in accordance with the invention. The advantages of the method of the invention apply analogously.

An advantageous development of the product according to the invention includes the product described herein, characterized in that it may be used for conditioning of a saline water, in particular the untreated saline water (RW), for a desalination process.

Thus, a saline water, in particular the untreated saline water, may be conditioned by means of the product for a desalination process.

Hereby the use of additional stabilizers for the water to be desalted may advantageously be avoided, so that not only the financial expense but also the logistical expense for operating a sea water desalination plant, for instance, is reduced.

In terms of use, the object of the invention is achieved through the use of the product (P), preferably hydrogen chloride (HCL or an aqueous solution thereof, which is produced by the method described herein, for conditioning saline water, in particular the untreated saline water (RW), for a desalination process.

Thus the product, preferably hydrogen chloride or an aqueous solution thereof, which is in particular produced according to the method of the invention, may be used for conditioning a saline water, in particular the untreated saline water, for a desalination process.

Here the advantages of the method of the invention apply analogously.

In terms of device technology, the object of the invention is achieved through the electrodialysis system described herein.

What is thus proposed for the first time is an electrodialysis system, preferably for carrying out the method of the invention, preferably for producing the product according to the invention, the electrodialysis system comprising at least:

the electrodialysis cell;
  wherein the electrodialysis cell comprises:
    an anion exchanger membrane,
    a cation exchanger membrane,
    a cathode, and
    an anode;
  the storage vessel for the catholyte and/or the first electrolyte;
  a reaction vessel, preferably for carrying out step (c).

Here the advantages of the method of the invention apply analogously.

Advantageous developments of the electrodialysis system according to the invention are subject matter of additional appended claims.

Thus, the electrodialysis cell may comprise three chambers, namely:
a cathode space accommodating the cathode,
a product space realized in the form of an intermediate chamber, and
an anode space accommodating the anode.

In addition, the electrodialysis system may comprise:
a storage vessel for the anolyte and/or the second electrolyte.

For the storage vessel for the anolyte and/or the second electrolyte, the advantages of the storage vessel for the catholyte and/or first electrolyte apply analogously.

The electrodialysis system may further comprise:
a storage vessel for the product.

Providing a storage vessel for the product allows temporal decoupling of the production of the product and its utilization.

Lastly, the storage vessel for the catholyte and/or the first electrolyte and/or the storage vessel for the anolyte and/or the second electrolyte may comprise at least one means for discharging gases, in particular hydrogen and/or oxygen gas.

The carrying off of gases from the educts or products of the electrodialysis process allows to increase the conductivity of the electrolytes and/or decrease the concentration or partial pressure of the products. Hereby the electrodialysis reaction is facilitated and its efficiency is enhanced.

BRIEF DESCRIPTION OF THE DRAWING

The invention is explained in more detail through the following practical examples while making reference to the FIGURES of the drawings, wherein:

FIG. 1 is a schematic overview of the electrodialysis system according to the invention, by means of which the production method in accordance with the invention may be carried out.

DETAILED DESCRIPTION

The electrodialysis system 1 represented in FIG. 1 comprises an electrodialysis cell 2, a storage vessel 4 for a first electrolyte E1 and/or a catholyte K, a reaction vessel 6, a storage vessel 8 for a second electrolyte E2 and/or anolyte A, as well as a storage vessel 10 for a product P.

The electrodialysis cell 2 comprises a cathode space 12, a product space 14, and an anode space 16, wherein the cathode space 12 is separated from the product space 14 by an anion exchanger membrane 18. The anode space 16 is separated from the product space 14 by a cation exchanger membrane 20. Inside the cathode space 12 a cathode 22 is arranged which is surrounded by the first electrolyte E1 and/or the catholyte K. In analogy, in the anode space 16 an anode 24 is arranged which is surrounded by the second electrolyte E2 and/or anolyte A.

The storage vessel 4 for the first electrolyte E1 and/or catholyte K has any desired shape, preferably a cylindrical shape.

The reaction vessel 6 preferably has a cylindrical, preferably cylindro-conical shape but is not restricted thereto.

The storage vessel 8 for the second electrolyte E2 and/or anolyte A as well as the storage vessel 10 for the product P may have any desired shape.

Inside the anode space 16 of the electrodialysis cell 2 the following anode reaction takes place:

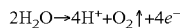

In accordance with the reaction the anolyte A loses water $H_2O$ while protons $H^+$ and gaseous oxygen $O_2$ are released at the anode 24. The anolyte A preferably contains sulfuric acid $H_2SO_4$ which serves for enhancing conductivity but is not reacted during the anode reaction.

Inside the cathode space 12 the so-called cathode reaction takes place:

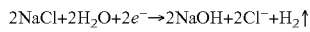

As a result of the ion migration through the membrane the concentration of chloride ions $Cl^-$ in the catholyte K diminishes. In contrast, the concentration of hydroxide ions $OH^-$ increases. Gaseous hydrogen is furthermore released at the cathode 22.

From the cathode space 12, chloride ions $Cl^-$ migrate through the anion exchanger membrane 18. On the other hand, protons $H^+$ migrate from the anode space 16 through the cation exchanger membrane 20. In the product space 14 these two ion species combine to form the desired product hydrogen chloride HCl or the acid thereof, namely, aqueous hydrochloric acid solution.

The first electrolyte E1 and/or catholyte K contained in the cathode space 12 of the electrodialysis cell 2 is permanently circulated via the storage vessel 4 by means of a pump P3. Hereby it is possible to degas the catholyte K through the release of hydrogen gas $H_2$ and at the same time enrich it with chloride ions $Cl^-$ by supplying chloride ions $Cl^-$ from outside into the storage vessel 4. The means for emitting the hydrogen gas $H_2$ is not represented in FIG. 1 for reasons of clarity.

Lastly, the catholyte K may be adjusted to a concentration of chloride ions $Cl^-$ that is optimum for the cathode reaction by circulating into the storage vessel 4.

Owing to the above-described anode reaction, the anolyte A in the anode space 16 continually loses water while gaseous oxygen $O_2$ forms at the anode 20. By circulating the anolyte A into the storage vessel 8 with the aid of a pump P4 it is possible to effectively degas the anolyte A by carrying off oxygen gas $O_2$. The means for emitting the oxygen gas $O_2$ is not represented in FIG. 1 for reasons of clarity.

Furthermore, the concentration of the anolyte A is diluted to the starting concentration prior to the reaction by supplying de-ionized water.

By means of a pump P5 the product P, i.e., diluted hydrochloric acid HCl, is pumped via the product space 14 of the electrodialysis cell 2 and the storage vessel 10.

By means of a pump P6 the product P is discharged to the consumer such as, e.g., a sea water desalination plant. Via a solenoid valve MV4 the volume of de-ionized water corresponding to the discharge quantity is supplied in a level-controlled manner.

As the catholyte K is depleted in chloride ions $Cl^-$ during the electrodialysis, the spent catholyte K must be replaced with fresh electrolyte when a predetermined minimum concentration of chloride ions $Cl^-$ is reached. This minimum concentration of chloride ions $Cl^-$ is situated in a range from 30 to 70%, preferably 33 to 50%, in particular 37 to 43% the concentration of chloride ions $Cl^-$ in the first electrolyte E1 in step (a) at the beginning of the electrodialysis reaction.

Here the concentration of chloride ions $Cl^-$ is measured by way of the conductivity of the catholyte K and/or of the first electrolyte E1. Alternatively the concentration of chloride ions $Cl^-$ may also be calculated by way of the electric charge having been conducted during the electrodialysis reaction.

As was set forth in the foregoing, at least a partial quantity of the catholyte K may be processed according to step (c) such as to result again in the first electrolyte E1. Concerning further details in this regard, the contents of the patent application deposited at the same time by the same applicant and having the title: "Method of treating an untreated saline water for producing a process water, process water thereby produced, and device for carrying out said method" (German Patent Application No. 10 2010 017 490.4 DE, filed Jun. 21, 2010) are herewith fully incorporated by way of reference.

The chloride ions Cl⁻ necessary for processing are furnished in the process water PW produced in accordance with the method of said application.

The method according to the invention presents a number of advantages for the user. Thus, altogether substantially only an untreated saline water and de-ionized water as educts as well as electric current are necessary.

All electrolytes present good electric conductivity. Consequently the cell voltage and the energy demand are low. When using sea water as untreated saline water in processing step (c) and in the subsequent, at least partial reuse of the catholyte K according to step (d) that was processed in accordance with the invention, the energy demand of the electrodialysis reaction is situated, e.g., at 0.2 to 0.4 kWh per mole of produced hydrogen chloride HCl.

The energy demand may be reduced further by using untreated saline water concentrates, for these present an elevated electric conductivity.

When processing at least a partial quantity of the catholyte K according to step (c), the interfering alkaline earth metal ions are advantageously separated and removed from the liquid in a substantially quantitative degree. As a result of this, and owing to the pH conditions existing in the individual cell spaces and the migration movements of the ions, a precipitation of poorly soluble alkaline earth metal salts in the electrodialysis cell 2 is effectively avoided. This advantageously materializes a long service life of the membranes of the electrodialysis system.

In accordance with the invention, hydrogen $H_2$ and oxygen $O_2$ are engendered separately from each other as exhaust gases which may be discharged or supplied to some other utilization without any problems or hazards.

In addition the product P produced in accordance with the method of the invention may be metered into the anolyte A and/or second electrolyte E2 in the anode space 16. The gaseous mixture oxygen $O_2$-chlorine $Cl_2$ thus produced is suitable for the sterilization of water.

Furthermore the electrodialysis system 1 may comprise further conduits, pumps, valves and the like which are not described in more detail and whereby the individual vessels such as, e.g., the electrodialysis cell 2, the storage vessel 4, the reaction vessel 6, the storage vessel 8, and the storage vessel 10 are connected to each other. Starting materials, intermediate products and final products may be thus be transported within the electrodialysis system 1.

In accordance with the invention, a product of the electrodialysis reaction, the catholyte K having an elevated concentration of hydroxide ions OH⁻, is used for the processing of an untreated saline water RW and thus as an educt in the processing method according to step (d).

In turn, a product of the processing method, namely, a first electrolyte E1 enriched in chloride ions Cl⁻ and depleted in hydroxide ions OH⁻ is used as an educt for the electrodialysis reaction.

As a result of this reciprocal use of educts and products, on the one hand the use of starting materials and chemicals is avoided or at least reduced. On the other hand, an efficient disposal of the respective engendered products is ensured at the same time.

In accordance with the invention, "salt" is understood to be any known salts, preferably alkali metal salts and/or alkaline earth metal salts, in a further preferred manner salts including halide ions as an anion, in particular NaCl, or mixtures thereof.

Besides the practical examples explained in the foregoing, the invention allows for further design approaches.

Thus, the storage vessel 4 for the catholyte K may at the same time also be used as a storage vessel for the process water PW of the processing method of step (c) which is not explained in more detail. This advantageously allows to save a storage vessel.

The invention claimed is:

1. A method of producing hydrogen chloride or an aqueous solution of hydrogen chloride by using an untreated saline water, the method comprising the steps of:
   furnishing a first electrolyte, wherein the first electrolyte contains chloride ions having an initial concentration of chloride ions;
   carrying out a first electrodialysis, wherein:
      the first electrolyte is subjected to a first cathodic reduction from which results a first catholyte;
      the concentration of chloride ions drops in the first electrolyte;
      a concentration of hydroxide ions increases in the first electrolyte; and
      a first product in a form of hydrogen chloride or an aqueous solution of hydrogen chloride is produced;
   processing at least a partial quantity of the first catholyte, from which results a second electrolyte, wherein:
      the untreated saline water is used;
      the concentration of chloride ions increases in the first catholyte; and
      the concentration of hydroxide ions drops in the first catholyte;
   furnishing a third electrolyte, wherein the third electrolyte contains chloride ions, and wherein the third electrolyte comprises at least a partial quantity of the second electrolyte; and
   carrying out a second electrodialysis, wherein:
      the third electrolyte is subjected to a second cathodic reduction from which results a second catholyte;
      the concentration of chloride ions drops in the third electrolyte;
      a concentration of hydroxide ions increases in the third electrolyte; and
      a second product in a form of hydrogen chloride or an aqueous solution of hydrogen chloride is produced.

2. The method according to claim 1, further comprising the step of:
   processing at least a partial quantity of the second catholyte, from which results a fourth electrolyte, wherein:
      the untreated saline water is used;
      the concentration of chloride ions increases in the second catholyte; and
      the concentration of hydroxide ions drops in the second catholyte.

3. The method according to claim 1, wherein the untreated saline water comprises:
   a natural salt water;
   a synthetically produced salt water; or
   a mixture of a natural salt water and a synthetically produced salt water.

4. The method according to claim 1, wherein the untreated saline water has a salt content up to saturation.

5. The method according to claim 1, wherein the first electrolyte is produced from the untreated saline water.

6. The method according to claim 1, wherein the step of processing at least a partial quantity of the first catholyte is carried out in batches or continuously.

7. The method according to claim 1, wherein the step of carrying out a first electrodialysis is carried out in an electrodialysis cell, wherein the electrodialysis cell comprises:
- a cathode space accommodating a cathode;
- a product space implemented in a form of an intermediate chamber; and
- an anode space accommodating an anode.

8. The method according to claim 7, wherein, during the step of carrying out a first electrodialysis, at least one of the first electrolyte or the first catholyte is circulated through the cathode space of the electrodialysis cell and through a storage vessel.

9. The method according to claim 1, wherein, during at least one of the steps, at least one of the first electrolyte, the first catholyte, the second electrolyte, the third electrolyte, or the second catholyte is tempered.

10. The method according to claim 1, wherein, during at least one of the steps, at least one of the first electrolyte, the first catholyte, the second electrolyte, the third electrolyte, or the second catholyte emits a gas.

11. The method according to claim 1, wherein the step of processing at least a partial quantity of the first catholyte is carried out as soon as:
- the concentration of chloride ions in the first electrolyte has a concentration in a range from 30% to 70% of the initial concentration of the chloride ions in the furnished first electrolyte;
- the concentration of chloride ions in the first catholyte has a concentration in a range from 30% to 70% of the initial concentration of the chloride ions in the furnished first electrolyte; or
- the concentration of chloride ions in the first electrolyte has a concentration in a range from 30% to 70% of the initial concentration of the chloride ions in the furnished first electrolyte, and the concentration of chloride ions in the first catholyte has a concentration in a range from 30% to 70% of the initial concentration of the chloride ions in the furnished first electrolyte.

12. The method according to claim 1, wherein, during the step of carrying out a first electrodialysis:
- a cell voltage has a range from 4 to 9 V;
- a cell current density has a range from 500 to 3,000 A/m$^2$; or
- a cell voltage has a range from 4 to 9 V, and a cell current density has a range from 500 to 3,000 A/m$^2$.

13. The method according to claim 1, further comprising the step of:
- conditioning a saline water with the first product or the second product for a desalination process.

14. A first product and a second product produced according to a method comprising the steps of:
- furnishing a first electrolyte, wherein the first electrolyte contains chloride ions having an initial concentration of chloride ions;
- carrying out a first electrodialysis, wherein:
  - the first electrolyte is subjected to a first cathodic reduction from which results a first catholyte;
  - the concentration of chloride ions drops in the first electrolyte;
  - a concentration of hydroxide ions increases in the first electrolyte; and
  - the first product in a form of hydrogen chloride or an aqueous solution of hydrogen chloride is produced;
- processing at least a partial quantity of the first catholyte, from which results a second electrolyte, wherein:
  - the untreated saline water is used;
  - the concentration of chloride ions increases in the first catholyte; and
  - the concentration of hydroxide ions drops in the first catholyte;
- furnishing a third electrolyte, wherein the third electrolyte contains chloride ions, and wherein the third electrolyte comprises at least a partial quantity of the second electrolyte; and
- carrying out a second electrodialysis, wherein:
  - the third electrolyte is subjected to a second cathodic reduction from which results a second catholyte;
  - the concentration of chloride ions drops in the third electrolyte;
  - a concentration of hydroxide ions increases in the third electrolyte; and
  - the second product in a form of hydrogen chloride or an aqueous solution of hydrogen chloride is produced.

15. The first product and the second product according to claim 14, wherein the method further comprises the step of:
- processing at least a partial quantity of the second catholyte, from which results a fourth electrolyte, wherein:
  - the untreated saline water is used;
  - the concentration of chloride ions increases in the second catholyte; and
  - the concentration of hydroxide ions drops in the second catholyte.

16. An electrodialysis system comprising:
a storage vessel; and
an electrodialysis cell comprising:
- an anion exchanger membrane;
- a cation exchanger membrane;
- a cathode; and
- an anode; and
a reaction vessel;
wherein:
- the storage vessel is configured to store a first electrolyte, wherein the first electrolyte contains chloride ions having an initial concentration of chloride ions;
- the electrodialysis cell is configured to:
  - receive the first electrolyte from the storage vessel; and
  - carry out a first electrodialysis, wherein:
    - the first electrolyte is subjected to a first cathodic reduction from which results a first catholyte;
    - the concentration of chloride ions drops in the first electrolyte;
    - a concentration of hydroxide ions increases in the first electrolyte; and
    - a first product in a form of hydrogen chloride or an aqueous solution of hydrogen chloride is produced;
- the reaction vessel is configured to:
  - receive at least a partial quantity of the first catholyte; and
  - process at least a partial quantity of the first catholyte, from which results a second electrolyte, wherein:
    - an untreated saline water is used;
    - the concentration of chloride ions increases in the first catholyte; and
    - the concentration of hydroxide ions drops in the first catholyte;
- the storage vessel is further configured to receive at least a partial quantity of the second electrolyte; and
- the electrodialysis cell is further configured to:
  - receive a third electrolyte from the storage vessel, wherein the third electrolyte contains chloride ions, and wherein the third electrolyte comprises at least a partial quantity of the second electrolyte; and carry out a second electrodialysis, wherein:
the third electrolyte is subjected to a second cathodic reduction from which results a second catholyte;
the concentration of chloride ions drops in the third electrolyte;
a concentration of hydroxide ions increases in the third electrolyte; and
a second product in a form of hydrogen chloride or an aqueous solution of hydrogen chloride is produced.

17. The electrodialysis system according to claim 16, wherein the reaction vessel is further configured to:
receive at least a partial quantity of the second catholyte; and
process at least a partial quantity of the second catholyte, from which results a fourth electrolyte, wherein:
the untreated saline water is used;
the concentration of chloride ions increases in the second catholyte; and
the concentration of hydroxide ions drops in the second catholyte.

18. The electrodialysis system according to claim 16, wherein the electrodialysis cell further comprises:
a cathode space accommodating the cathode;
a product space comprising an intermediate chamber; and
an anode space accommodating the anode.

19. The electrodialysis system according to claim 16 wherein the storage vessel is further configured to discharge a gas.

* * * * *